United States Patent [19]
Boren

[11] 4,191,259
[45] Mar. 4, 1980

[54] ROTARY CULTIVATOR AND MULCHER

[76] Inventor: Charles F. Boren, 16230 Orchard Ave., Gardena, Calif. 90247

[21] Appl. No.: 916,864

[22] Filed: Jun. 19, 1978

[51] Int. Cl.² .............................................. A01B 33/04
[52] U.S. Cl. ........................................ 172/43; 172/27
[58] Field of Search ....................... 172/27, 43, 42, 39, 172/66, 123; 56/294

[56] References Cited

U.S. PATENT DOCUMENTS

| | | | |
|---|---|---|---|
| 2,117,065 | 5/1938 | Lassas | 172/39 |
| 2,974,616 | 3/1961 | Pawela | 172/39 |
| 3,348,619 | 10/1967 | Reynolds | 172/66 |
| 3,388,750 | 6/1968 | Hamm | 172/39 X |
| 3,901,325 | 8/1975 | Richards | 172/43 |

FOREIGN PATENT DOCUMENTS 6807087  11/1969  Netherlands ............................ 172/123

*Primary Examiner*—Richard J. Johnson
*Attorney, Agent, or Firm*—Howard L. Johnson

[57] ABSTRACT

A rotary cultivator formed with vertically rotating pairs of transverse-ended ground-penetrating spoke-like end-bladed wheels. Such assembly now adds horizontal pairs of fixed cutter blades spaced respectively one outward from the peripheral path of the wheel-blades and the other radially inward therefrom, plus other laterally projecting blades extending into the "open-cage" formed by each pair of mutually-facing bladed wheels. Standing vegetation against which the cultivator is moved may be severed into segments, additionally miniaturized within the open-cage, and churned into the top soil upon penetration of the wheel blades. Trailing vines or weeds which might otherwise attach to and wind around the shaft are also cut off. Such-sub-unit of interacting cutter blades can be added to present roto-tillers, or be fabricated as part of the initial unit.

9 Claims, 6 Drawing Figures

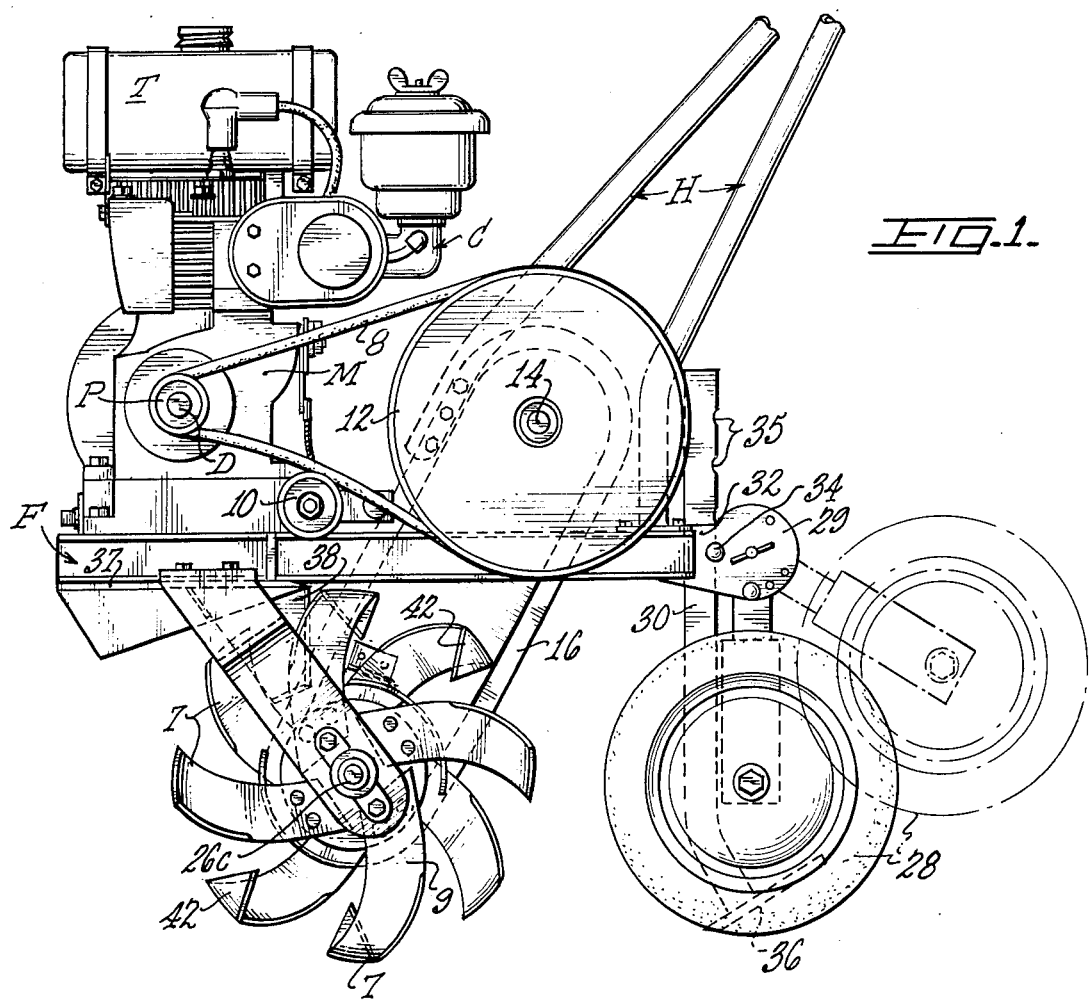

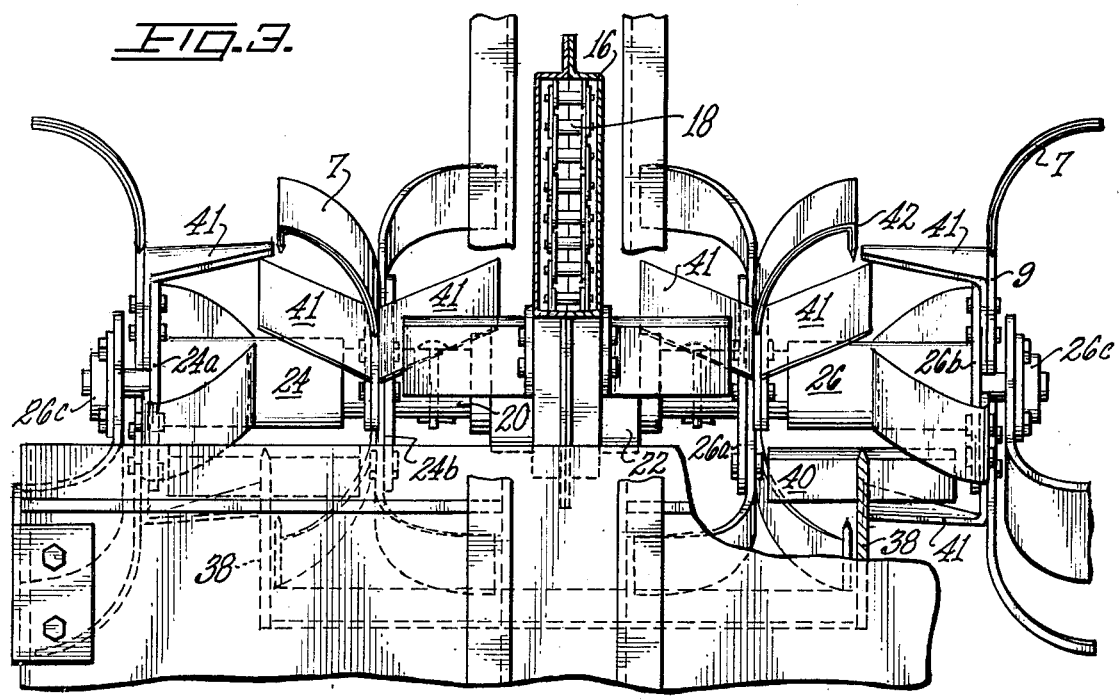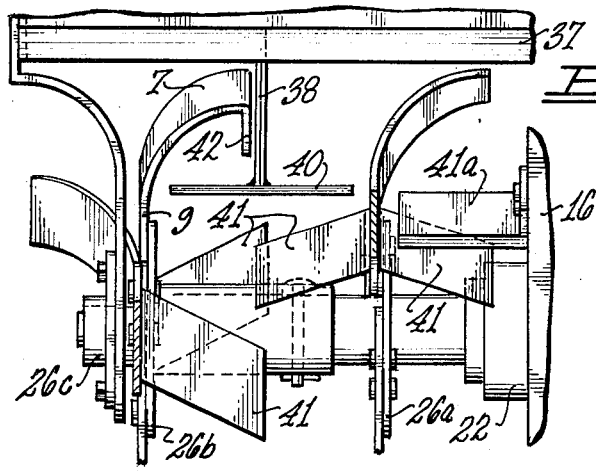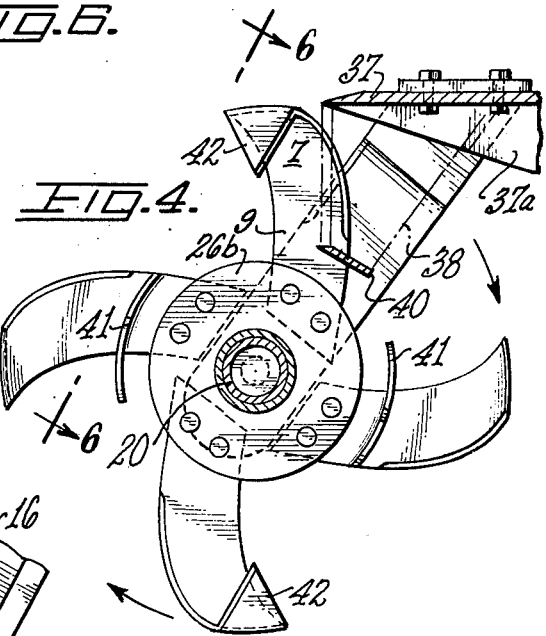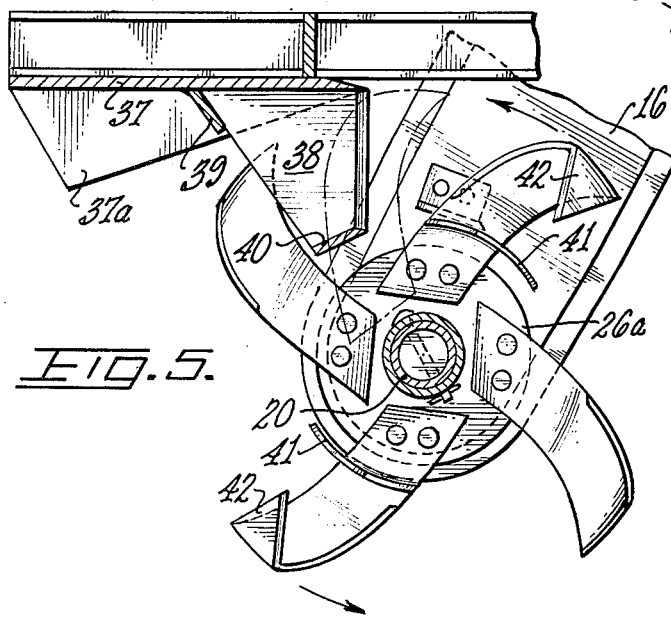

ROTARY CULTIVATOR AND MULCHER

BACKGROUND OF THE INVENTION

Current rotary cultivators, sometimes called rototillers, such as used particularly on small plots and gardens, have powerdriven "wheels" formed by a peripheral series of projecting (often L-shaped) tines, which by their revolving passage through the top layer of soil, serve to loosen and aerate the soil. Organic material (which may have been previously spread over the ground) is thus churned into the loosened soil, together with any low ground cover such as weeds and legumes. Such assembly usually includes a pair of wide-tire wheels to give stability to the frame; such wheels may be on a powered shaft for forward propulsion of the machine or they may be free-rolling on an idler axle merely for stability. Such support wheels may either be in advance or behind the rotary tillers, and in addition there may be some adjustment means for varying the depth of penetration or ground clearance of the tiller blades, either by tilting one end of the frame relative to the support rollers or by means of adjustable depth control. The amount of penetration of course must also be related to the hardness of the soil, and achievement of a desired depth may depend upon several passes of the cultivator.

However the efficiency of such assemblies for a single pass operation is practically limited to their use on plots having a very low ground coverage or to cleared ground on which organic matter has already been spread for the purpose of having it turned under. Thus with areas having a tall stand of vegetation, this cannot be both cut and turned under with a single pass of the conventional rototiller. It is usually recommended that such a field first be mowed or otherwise cleared by a separate machine such as a mower and then the cultivator be passed over it with the rotary blades in ground penetration position. Part of the reason for this is that ground churning must proceed at a relatively slow cutter speed, while chopping up the top growth of vegetation is most effective at a higher cutter speed. Another difficulty in using the rototiller in place of a mower for high growth is that trailing vines and the like will wrap themselves around the rotating parts and have to be removed ultimately by cutting with a knife or by pulling out by hand.

Accordingly it is an object to provide an improved rototiller or rotary cultivator of such type which can at the same time cut and mix into the churned soil often in one operation, a considerable top growth of vegetation, rather than having to accomplish this by use of two or more assemblies, such as a mower plus a cultivator. On the other hand, when used solely for ground clearance (of weed, vines etc) the present assembly is more effective than the conventional rototiller. In one form, the invention provides an attachment that can be added to present rototillers to obtain such result.

SUMMARY OF THE INVENTION

The instant invention provides a sub-unit which can be added to the frame of present rototillers, or alternately can be incorporated into new-made total assemblies, which unit carries a fixed, horizontal pair of cutter blades which act in conjunction with rotating cultivator blades to sever and fractionate upstanding vegetation. The pair of fixed blades are particularly useful in association with so-called "bolo-blades" of the cultivator, that is, those in which the free (ground-penetrating) ends of the blades are curved or disposed transversely, analogous to a bolo knife. One of the fixed blades is located above and beyond the periphery of the vertically rotating series of cultivator blades (bolo blades). The second blade is spaced radially inward from the swing periphery. The fixed blades, and particularly the inner one are effective in cutting trailing vines and the like which might otherwise wind themselves around the shaft of the cutters and ultimately have to be removed by manual use of a knife or be un-wound by hand.

Thus a paired series of mutually inturned or facing, circumferentially staggered bolo blades form what amounts to an open cage which assembly has a fixed horizontal cutter blade which in above-ground (mowing) operation serves to cut up longer pieces of vegetation into shorter lengths before dropping it to the ground to be churned under. In the absence of such fixed horizontal blades, such growth might "ball-up" in this area and eventually choke or stop the ground breaking effect of the cultivator.

Such complementary series of bolo blades have their outer ends turned toward each other and spaced apart by a small horizontal clearance. The present structure provides a vertical arm extending through this clearance (from the main frame or assembly) so as to locate the inner fixed blade of the horizontal pair, projecting in both directions from the support arm.

In addition, some of the bolo blades may also have their fore ends extended radially inward to form an additional cutting edge to provide a shearing action closely adjacent the vertical arm.

BRIEF DESCRIPTION OF THE DRAWINGS

FIG. 1 is a side elevational view of a rotary cultivator carrying an integrated mowing unit with the wheels in normal support position, and alternately (in broken lines) in upswung position so as to allow ground contact or penetration of the drag bar.

FIG. 2 is an end elevational view of the forward position of the cultivator as viewed from the left of FIG. 1 in front of the drag bar and rollers.

FIG. 3 is a horizontal sectional view taken along the line 3—3 of FIG. 2.

FIG. 4 is a vertical sectional view taken between a pair of cutter blades as seen along the line 4—4 of FIG. 2.

FIG. 5 is a vertical sectional view taken between the pair of cutter blades as seen along the line 5—5 of FIG. 2.

FIG. 6 is an elevational view of the inner cutter blades as viewed along the line 6—6 of FIG. 4.

DETAILED DESCRIPTION OF THE PREFERRED EMBODIMENT

The present walking-type cultivator is formed with a generally horizontal frame or carriage F which supports along its upper face a motor M with conventional (gasoline) fuel tank T, carburetor C, and guidance handles H. A drive shaft D and pulley P are connected by a roller-tensioned (10) V belt 8 to a drive pulley 12. An axial shaft 14 of the latter is journalled in a chain housing 16 which carries an endless chain 18 extending about a drive axle 20 supported by end bearings 26c (FIG. 3) which traverses a central housing 22 and extends to a spool-like hub 24, 26 on each side and terminal bearing cup 26c. Each hub plate 24a, 24b, 26a, 26b carries a radially projecting (spoke-like) series of eliptical shaped or bolo blades 7 secured adjacent each vertical face of a plate, of which the terminal cutting ends (free ends) of each series are directed respectively right or left (FIGS. 2,6) usually alternate ones in opposite directions.

Each series of blade-ended spokes 9 thus forms a (chain) driven (18) or cultivating wheel followed by a pair of idler rollers or support wheels 28 which are pivotally positioned toward or away from ground contact by a support fixture 29. It will be appreciated however, that the support rollers may be either leading or following the cultivator wheels.

Still another type couples a lengthwise transmission shaft to both the rollers and the tilling wheels, with a clutch connection to each if desired. In any event, the present pair of fixed horizontal cutter blades are integrated into the cultivator blade-wheel so as to be effective in cutting organic material which is either upstanding or lying down on the ground, and in either event the ground penetrating blades mix the cut material into the soil to produce a mulching and plowing effect.

Thus, if there is an initial top growth or ground cover, which may be grown for its soil-nutrient value, it may be sufficiently high as to be first "harvested" by passage of the rototiller thereover, then the latter lowered to the tilling position for another run or runs, thus serving to cut and turn under the required quantity of vegetation in a substantially continous operation. Or severed vegetation such as weeds, vines and other organic material may be spread on the ground in a desired pattern or row and the cultivator run over them in lowered position so as to cut them into smaller pieces and simultaneously turn the latter into the soil in one continuous operation.

In some instances, conventional auxilliary attachments such as a furrower, dozer or scraper (grader), etc. may be connected to the cultivator for special purpose runs.

When the rear wheels 28 are lifted and secured in an angular or uptilted position (FIG. 1), a vertical bar 30 can be lowered a desired amount through a polygonal collar 32 and anchored at a selected position therein by insertion of a cross pin 34 passed through any one of a series of notches 35, thus to locate a drag bar 36 at a calculated or desired level of ground penetration. This results in a central furrow produced by the drag bar and also prevents the pair of wheels from flattening the side tracks along which they would otherwise follow. In addition to uptilting the cutter wheels (as by the operator bearing down on the assembly), their depth penetration may be increased by down-tilting the cutter wheels as well as by the use of different length blade spokes 9 which in some cases may be as much as 12 or 14 inches long (and penetrate this full length).

The space between a pair of hub plates 24a, 24b or 26a, 26b which forms an open-cage, carries a circumferential series of vertical blades 9 disposed adjacent each side of the plate. The outer ends of the tines that turn toward each other, although circumferentially staggered (preferentially), are spaced apart by only a small distance in most instances, such as ¼ to 5/16 inch. In this "gap" is fixed a generally vertical support arm 38 (FIGS. 2,6) which terminally carries a transverse cutter blade 40, sharpened along its inner edge and extending horizontally, generally equidistant in each direction, that is, toward the respective blade spokes 9 and spaced radially in from the circumferential path of the tines 7.

An attachment plate 37 bolted or welded to the frame F supports each vertical arm 38 and a rear extending segment 37a (FIG. 5) supports an outer fixed blade 39 which is angularly and transversely disposed toward the cutter spokes 9 and aligned approximately radially to the axle 20. It will be observed that the cutter wheels, especially when constituting the motive force of the assembly, rotate in the direction indicated by the arrows in FIG. 5. Their shearing force, consequently is both downward and forward in the direction of movement of the assembly. But at the same time, this arrangement avoids the deliberate close shearing such as found in a horizontal bar lawn mower. In other words, it provides a "loose" chopping action which produces small enough pieces of vegetation so as to be easily turned into the soil but which are not cut unnecessarily small so as to rapidly abrade the moving parts of the rototiller. In addition, the "open-cage" prevents the dropping of unduly large pieces.

Additional mixer blades 41 extend angularly from the inner face of a spoke 9 (FIGS. 4–5) (or horizontally 41a from the drive housing (16) FIGS. 3, 6) and project for a portion of the axial span or width of the "cage" into the cylindrical cavity formed between each pair of hub plates (24a, 24b, 26a, 26b) and their respective pair of mutually-facing spokes 9 and end blades 7. Such rectangular plates 41 may be sharpened on each of their free edges; they act both as mixing elements for the tumbling contents of the cage and as further "chopper" blades for reducing the length of longer pieces such as stems or stalks.

Although such number of units is not critical, it will be seen that each series of blade-wheels consists of four (equally spaced) spokes 9. Alternate spokes have their curved outer ends 7 turned back radially-directed to form what might be called an edge-sharp scaper or wiper blade or surface 42 (FIG. 2) which is positioned close enough (without necessarily touching) to prevent any appreciable build-up of dirt, vegetation, etc. on the adjacent face of the vertical support arm 38. Likewise the blade 42 acts to sever trailing vines, rope, etc. which might catch and start to wind about the shaft 20 and if not thereafter released in some manner, would otherwise continue to ball up and in some cases choke or actually stop the action of the assembly. It will be apparent also that the number of blade-wheels is limited only by the length of the supporting axle (and adequate motive power to drive it). The pattern of the opposite members of each series of blade-wheels having their free ends turned toward each other (as well as circumferentially staggered) serves to produce the "open cage" with which the present cutter blades can so effectively cooperate. However in some instances it may be desired to extend the free ends of the spokes 9 (as cutter blades 7) in both (horizontal) directions. The spoke series would then be axially separated along the length of the shaft 20. Although primarily intended to be power driven, in more primitive areas of cultivation, such rototiller could merely be drawn by human or animal power. In fact, such assembly can be used to turn up or identify, shallow buried anti-personnel mines and the like.

I claim:
1. A rotary cultivator comprising in combination:
   a support frame carrying at least one generally annular pair of axially-separated rotary members disposed for rotation on a transverse axis, each member of the pair comprising a plurality of radially extending cutting means having outer terminal blades, individually providing a transverse ground-penetrable edge, roller means carried by the support frame spaced from said rotary members and adapted to go along a selected path of travel of the cultivator, with the terminal blades selectively disposed in ground clearance or ground penetration position, the axial space which is intermediate said pair of rotary members and which extends outward from said axis to the terminal blades, having a pair of cutter blades disposed therein generally parallel to said axis and radially spaced apart, one fixed to said frame and the other being rotatable with said axis and rotary members, whereby upon movement of the cultivator against standing vegetation the latter may be severed and at least some cut into short pieces and churned into the ground by joint action of the terminal blades and the pair of cutter blades.

2. A cultivator according to claim 1 wherein said rotary members have individual spoke-like arms carrying generally L-shaped terminal blades, with at least some blades of each member of the pair directed toward each other but leaving a gap therebetween so as to form an open cage, and including a support arm carried by said frame, extending radially through said gas into the open cage and terminally holding said fixed cutter blade within the open cage which is thus rotatable around it.

3. A cultivator according to claim 2 wherein at least one of said L-shaped terminal blades of a pair is provided with an additional radially-inward-directed blade disposed generally parallel to and spaced from the radial arm and thus rotatable adjacent said fixed support arm.

4. A cultivator according to claim 1 wherein said rotatable one of the pair of cutter blades is fixed to an L-shaped arm forming part of said radially extending cutting means and carrying an outer terminal blade.

5. A cultivator according to claim 2 wherein the spoke-like arms carrying L-shaped blades of each of said pair of rotary members are circumferentially staggered relative to the blades of the other rotary member.

6. A mowing unit adapted for attachment to the frame of a rotary cultivator to provide means for segmenting standing vegetation in association with vertical rotation of a generally annular pair of rotary members each having multiple ground-penetrable blades, said unit comprising a positioning frame disposing a fixed cutter blade generally parallel to and above the axis of said rotary members and spaced inward from the peripheral path of rotation of said ground penetrable blades, plus another cutter blade spaced radially from the fixed blade and carried by one of said pair of rotary members.

7. A mowing unit according to claim 6 wherein said positioning frame includes a radially directed support arm adapted to traverse an axial gap formed between adjacent ends of the ground-penetrable blades of said pair of rotary members when such blades are directed toward each other so as to form an open cage.

8. A pair of rotary members adapted for attachment to the axle of a rotary cultivator, each of said members having a peripheral series of ground-penetrable blades carried by generally L-shaped arms so as to dispose said blades generally parallel to said radially spaced from said axle, at least one of said blades having a radially-inward-directed cutting extension axially spaced from its spoke.

9. A pair of rotary members according to claim 8 wherein at least one of said members includes a generally axially extending blade, thus rotatable with said member.

* * * * *

UNITED STATES PATENT OFFICE
CERTIFICATE OF CORRECTION

Patent No. 4,191,259         Dated March 4, 1980

Inventor(s) Charles F. Boren

It is certified that error appears in the above-identified patent and that said Letters Patent are hereby corrected as shown below:

Column 5, line 27 (claim 2), "gas" should read --gap--.

Signed and Sealed this

Seventeenth Day of June 1980

[SEAL]

Attest:

SIDNEY A. DIAMOND

Attesting Officer    Commissioner of Patents and Trademarks